(12) United States Patent
Terek

(10) Patent No.: US 6,480,851 B1
(45) Date of Patent: Nov. 12, 2002

(54) EFFICIENT COMPUTATION OF AGGREGATED DATA IN CONTAINERS SUPPORTING ITEM LEVEL ACCESS CONTROL

(75) Inventor: F. Soner Terek, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/411,595

(22) Filed: Oct. 4, 1999

(51) Int. Cl.$^7$ ............................................. G06F 17/30
(52) U.S. Cl. ............................................. 707/9; 707/10
(58) Field of Search .............................. 707/500, 7–10, 707/100, 205; 713/150, 152, 164–170, 182, 200–202; 345/741–743

(56) References Cited

U.S. PATENT DOCUMENTS 6,199,106 B1 * 3/2001 Shaw et al. ................. 709/206
6,311,211 B1 * 10/2001 Shaw et al. ................. 709/217
6,314,408 B1 * 11/2001 Salas et al. ................... 705/54

* cited by examiner

Primary Examiner—Alford W. Kindred
(74) Attorney, Agent, or Firm—Workman, Nydegger, Seeley

(57) ABSTRACT

A computer system data container such as a directory or data folder includes various items (e.g., e-mail messages) having item level security controls. In this invention, the computer system ignores files for which the viewer has no viewing rights when summary data about the data container is displayed on the viewer's monitor. For each item level security setting, a running total is kept of an aggregate property (e.g., count of, size of) of all the items in the directory or folder of that security setting. Changes to the running total occur as items are added or deleted, or edited if the aggregate property is the size of all items of that security setting. Regardless of what the aggregated data is, the computer system adds only the running totals for which the user has viewing rights when computing summary data. Thus, the user cannot infer anything about non-viewable items from the summary data.

28 Claims, 8 Drawing Sheets

| Item ID (402) | ACL ID (404) | Item Data (406) |
|---|---|---|
| 1 | 2 | ... |
| 2 | 1 | ... |
| 3 | 1 | ... |
| 4 | 1 | ... |
| 5 | 1 | ... |
| 6 | 3 | ... |
| 7 | 4 | ... |

FIG. 4

| ACL ID (502) | ACL Definition (504) | Summary Data | |
|---|---|---|---|
| | | Count of ... (506) | Size of ... (508) |
| 1 | ... | 4 | 18k |
| 2 | ... | 1 | 7k |
| 3 | ... | 1 | 2k |
| 4 | ... | 1 | 1k |

FIG. 5

|Item ID|ACL ID|Item Data|
|---|---|---|
|1|2|...|
|2|1|...|
|3|1|...|
|4|1|...|
|5|1|...|
|6|3|...|
|7|4|...|
|8|1|...|

FIG. 6

| ACL ID | ACL Definition | Summary Data | |
|---|---|---|---|
| | | Count of ... | Size of ... |
| 1 | ... | 5 | 26k |
| 2 | ... | 1 | 7k |
| 3 | ... | 1 | 2k |
| 4 | ... | 1 | 1k |

FIG. 7

| Item ID (402) | ACL ID (404) | Item Data (406) |
|---|---|---|
| 1 | 2 | ... |
| 2 | 1 | ... |
| 3 | 1 | ... |
| 4 | 1 | ... |
| 5 | 1 | ... |
| 6 | 3 | ... |
| 7 | 4 | ... |
| 8 | 5 | ... |

| ACL ID (502) | ACL Definition (504) | Summary Data | |
|---|---|---|---|
| | | Count of ... (506) | Size of ... (508) |
| 1 | ... | 4 | 18k |
| 2 | ... | 1 | 7k |
| 3 | ... | 1 | 2k |
| 4 | ... | 1 | 1k |
| 5 | ... | 1 | 8k |

| Item ID (402) | ACL ID (404) | Item Data (406) |
|---|---|---|
| 1 | 2 | ... |
| 3 | 1 | ... |
| 4 | 1 | ... |
| 5 | 1 | ... |
| 6 | 3 | ... |
| 7 | 4 | ... |

| ACL ID (502) | ACL Definition (504) | Summary Data | |
|---|---|---|---|
| | | Count of ... (506) | Size of ... (508) |
| 1 | ... | 3 | 12k |
| 2 | ... | 1 | 7k |
| 3 | ... | 1 | 2k |
| 4 | ... | 1 | 1k |

| Item ID (402) | ACL ID (404) | Item Data (406) |
|---|---|---|
| 2 | 1 | ... |
| 3 | 1 | ... |
| 4 | 1 | ... |
| 5 | 1 | ... |
| 6 | 3 | ... |
| 7 | 4 | ... |

| ACL ID (502) | ACL Definition (504) | Summary Data | |
|---|---|---|---|
| | | Count of ... (506) | Size of ... (508) |
| 1 | ... | 4 | 18k |
| 3 | ... | 1 | 2k |
| 4 | ... | 1 | 1k |

| ACL ID (502) | ACL Definition (504) | Summary Data | |
|---|---|---|---|
| | | Count of ... (506) | Size of ... (508) |
| 1 | ... | 4 | 18k |
| 2 | ... | 1 | 9k |
| 3 | ... | 1 | 2k |
| 4 | ... | 1 | 1k |

EFFICIENT COMPUTATION OF AGGREGATED DATA IN CONTAINERS SUPPORTING ITEM LEVEL ACCESS CONTROL

BACKGROUND OF THE INVENTION

1. The Field of the Invention

The present invention relates to electrical computers and data processing systems. Specifically, the present invention relates to the efficient computation of aggregated data in containers supporting item level access control.

2. The Prior State of the Art

Most computer systems have some sort of data storage system involving the storage of data items in particular data containers, For example, in messaging systems, messages might be stored within folders. In filing systems, items might be stored within directories. If a particular folder or directory is selected, the item titles in the folder or directory are typically displayed. It is often desirable to also display, or at least keep track of, summary aggregated data about the items in the container such as the count of items in the container and/or the total size of all the items in the container. There are several methods for providing this summary data.

One simple method is to enumerate the summary data each time the summary data is requested such as when the item titles are displayed. Thus, for example, if the count of the items is the summary data to be displayed, the items are literally counted. If the total size of the items is the summary data to be displayed, the memory size corresponding to each item is summed. This approach requires extensive counting and summing calculations for all the items in a container each time the summary data is requested. Thus, this approach can take significant processing time especially if there are hundreds or thousands of items in the container.

Another more efficient approach is to keep a running aggregate summary of the items in the container. For example, the total number of items and the total size of all the items in the container at any given time are stored in memory. Subsequently, if an item is added to or deleted from the container, a value representing the count of the items is incremented or decremented as appropriate. Furthermore, a value representing the total size of all the items in the container is decreased or increased by the size of the item deleted or added, respectively. Furthermore, if an item is altered, the value representing the total size of all the items is changed by the size change of the altered item. For example, suppose the total size of all the items is 500 kilobytes, which includes a particular item having a size of 10 kilobytes. If the size of the item is expanded from 10 kilobytes to 14 kilobytes, the total size of all the items increases by 4 kilobytes to a total size of 504 kilobytes. The latter running aggregate approach is more efficient since all that is required is to update the summary data when the items are deleted, added, or updated.

The running aggregate approach works fine if there are no item level security controls for the container. However, it is often desirable to set a security access for each item such that the viewing or editing of some items is restricted to certain users. For example, a template might be restricted to being viewable, but not editable by most users. Some highly confidential documents might be restricted to be viewable to only some users. Typically, if an item is not to be viewed by a user, the item title will not be displayed to the user when the container is selected, and the user should not even know of the existence of the item. However, the running aggregate approach tallies summary data which includes items that are not to be viewed by the user. For example, suppose that a container has 20 items total, 19 of which are viewable to anyone, and 1 of which is not to be viewed by a given user. As the user views the container, the user will only see 19 item titles. However, the summary data will indicate there are 20 items. Thus, the user can infer that an item exists in the container that is not visible to the user.

Imparting such knowledge, even by inference, to a user who does not have security access to view the document is undesirable. In light of the above, a method and structure are desired for efficiently computing summary aggregated data in containers having item level security controls without disclosing the existence of non-viewable items.

SUMMARY OF THE INVENTION

In accordance with the present invention, a computer system data container such as a directory or data folder supports item level security settings and includes various items such as e-mail messages. One item in the container may have a liberal security setting which allows everyone to read and edit the item. Another might restrict everyone from reading the item except for the author or addressee. Between these two extremes are an infinite variety of security settings that may be tailored as desired by one who controls the security setting. For example, if the subject matter of the message is a general reminder of a surprise party to be held for an individual, the author might post the message with a security setting indicating that everyone can view the message except for the individual for whom the surprise party is held. The present invention allows for the computer system to ignore files for which the viewer has no viewing rights when summary data about the data container is displayed on the viewer's monitor. Thus, the viewer cannot infer from the summary data that any non-viewable items exist within the container.

For each security setting, a running total is kept of an aggregate property of all the items in the container of that security setting. For example, if the aggregate property is a total count of items of that security setting, a summary data table associated with the container includes data fields representing each security setting, and the number of items of that security setting in the folder. If an item is added (or deleted) of a given security setting, the count for that security setting is increased (or decreased) by one. If the aggregate property is the total size of items of that security setting, the total size for that security setting in the summary data table is increased by the size of any added item, or decreased by the size of any deleted item. Changes in sizes due to editing of existing items are also considered in changing the total size associated with a given security setting.

Regardless of what the aggregated data is, it is sometimes appropriate to compute the aggregated data corresponding to only those items in the container for which the user has viewing rights. For example, when the user selects a container to view the items in the container, the computer system might compute the sum of the running totals of the aggregate property for all of the security settings for which the user has viewing rights. As an illustration, suppose that a folder contains 4 items of security type #1, 1 item of security type #2, 1 item of security type #3, and 1 item of security type #4. Now suppose the user has viewing rights to only items of security types #1 and #2. When the user selects the folder to see the items in the container, the user will see only the five items. Furthermore, to determine the count of items in the data container, the computer will add the count of items of the security type #1 (i.e., four) to the count of items of the security type #2 (i.e., one) to display that the data container containers five items total. Thus, the user is not notified of the existence of items in the data container for which the user does not have viewing rights.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 shows a contents table associating each data item of the information viewer portion of the image of FIG. 2 with item and security setting identification numbers;

FIG. 5 shows a summary data table associated with the contents table of FIG. 4, the summary data table tabulating the count and the total size of items for each security setting;

FIG. 6 shows the state of the contents table of FIG. 4 after a new item having one of the security settings of FIG. 5 is added to the selected folder of FIG. 2;

FIG. 7 shows the summary data table associated with FIG. 6;

FIG. 8 shows the state of the contents table of FIG. 4 after a new item having a new security setting from those of FIG. 5 is added to the selected folder of FIG. 2;

FIG. 9 shows a summary data table associate with FIG. 8;

FIG. 10 shows the state of the contents table of FIG. 4 after an item, for which there are other items having the same security setting, is deleted from the selected folder;

FIG. 11 shows a summary data table associate with FIG. 10;

FIG. 12 shows the state of the contents table of FIG. 4 after an item, for which there are no other items having the same security setting, is deleted from the selected folder;

FIG. 13 shows a summary data table associate with FIG. 12; and

FIG. 14 shows a summary data table after an item has been altered.

DETAILED DESCRIPTION OF THE PREFERRED EMBODIMENTS

A computer system in accordance with the present invention has a data container such as a directory or data folder that supports item level security settings and includes various items such as e-mail messages or files. One item in the container may have a liberal security setting which allows everyone to read and edit the item. Another might restrict everyone from reading the item except for the author or addressee. Between these two extremes are an infinite variety of security settings that may be tailored as desired by one who controls the security setting. The present invention allows for the computer system to ignore files for which the viewer has no viewing rights when summary data about the data container is displayed on the viewer's monitor. Thus, the viewer cannot infer from the summary data that any non-viewable files exist within the folder.

The invention is described below by using diagrams to illustrate either the structure or processing of embodiments used to implement the systems and methods of the present invention. Using the diagrams in this manner to present the invention should not be construed as limiting of its scope. The present invention contemplates both methods and systems for efficiently computing aggregated data in folders that support item level access control. The embodiments of the present invention may comprise a special purpose or general purpose computer including various computer hardware, as discussed in greater detail below.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
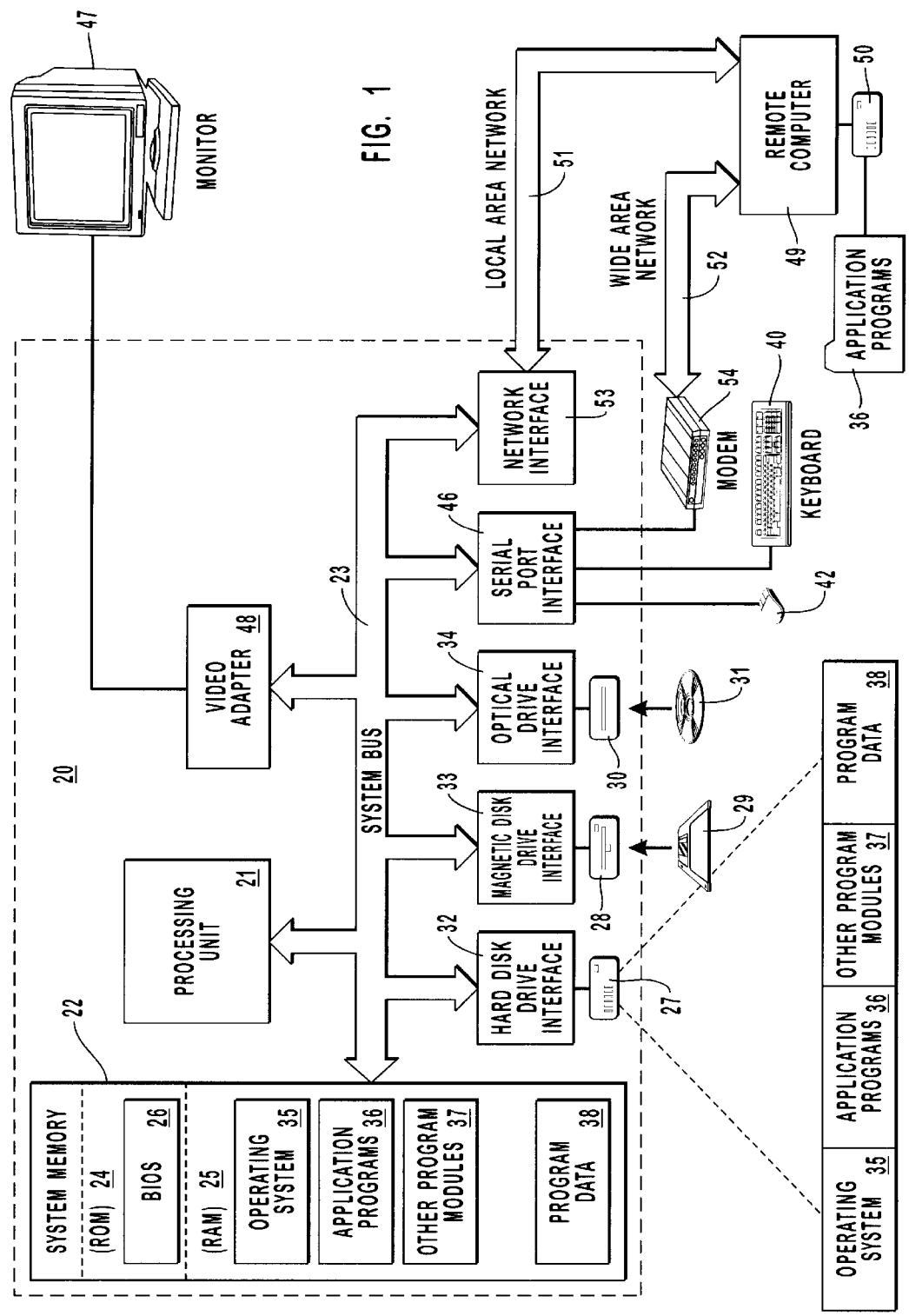
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk 29 and a removable optical disk 31, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
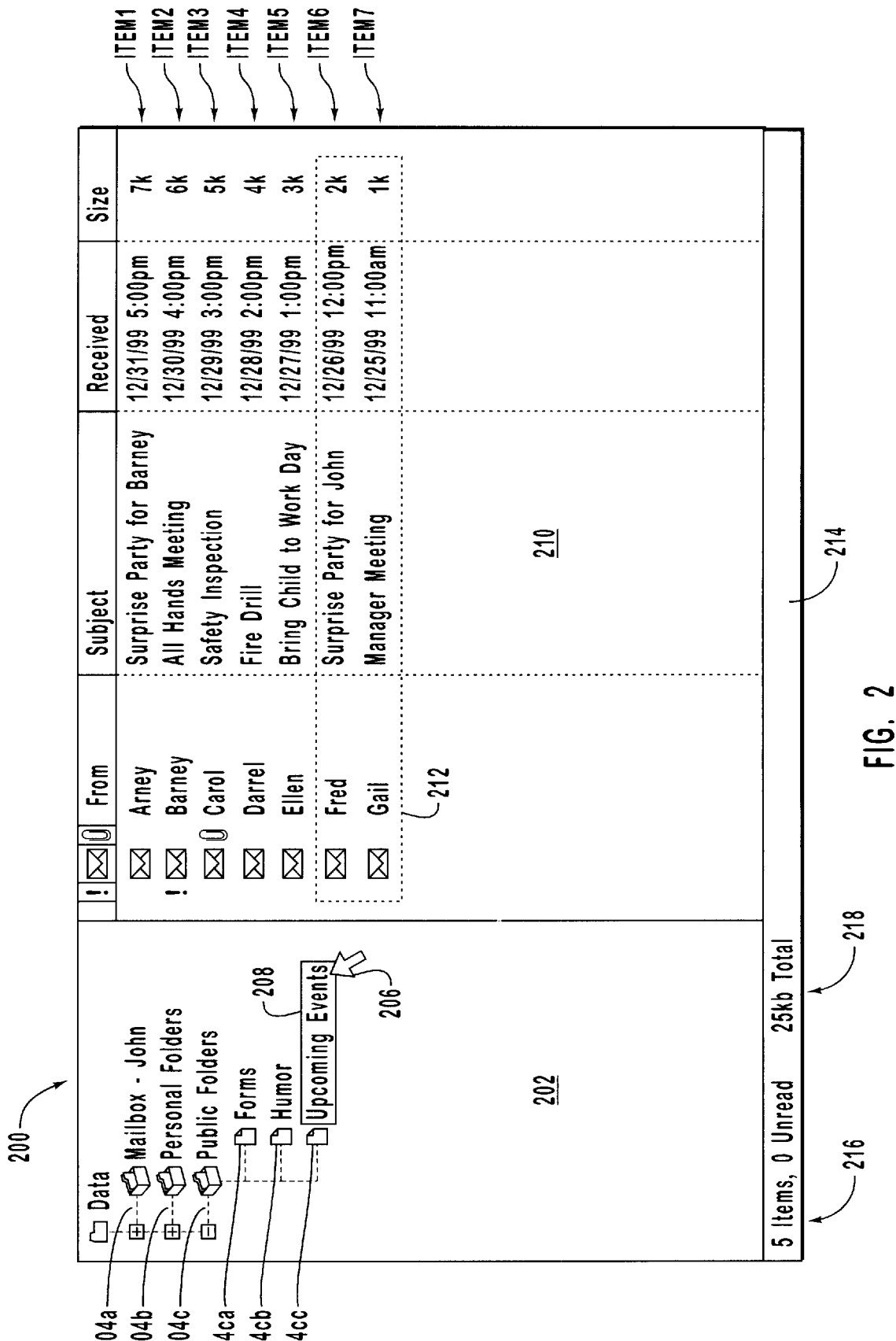
FIG. 2 shows an image as would appear on the monitor of FIG. 1 if a program is run by the computer of FIG. 1.
Figure 3A:
FIGS. 3A–3D each shows an example of a data structure representing a security setting.
Figure 3B:
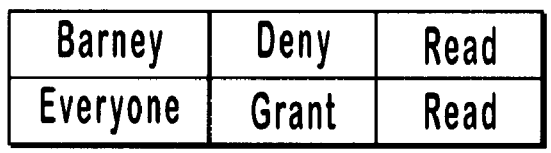
Figure 3C:
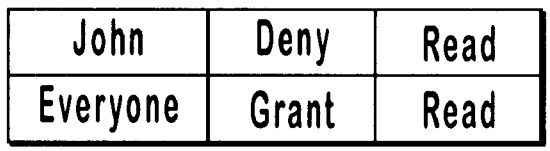
Figure 3D:

Application programs 36 include a data storage program such as a messaging program. Program data 38 includes data items such as messages corresponding to the messaging program, where the data items are organized in folders. For example, the messaging program may display the image 200 shown in FIG. 2 on the monitor 47 when the messaging program is executed by the processing unit 21. FIG. 2 shows the image 200 as it would be displayed to a user fictionally named "John". The left side of the image 200 includes a folder list portion 202 including root folders 204a, 204b and 204c, and branch folders 204ca, 204cb and 204cc stemming from 18 root folder 204c. A pointer 206 has been moved over the branch folder 204cc entitled "Upcoming Events" by maneuvering the pointing device 42 (FIG. 1). The Upcoming Events folder (or container) 204cc has been selected by the pointing device 42 as indicated by the selection box 208 enclosing the folder title.

Items logically located within the selected "Upcoming Events" folder 204cc are listed in the item viewer portion 210 of the image 200 on the right hand side of the image 200. These items include ITEM1, ITEM2, ITEM3, ITEM4, ITEM5, ITEM6 and ITEM7. Each item ITEM1 through ITEM7 includes a sender name (namely, Arney, Barney, Carol, Darrel, Ellen, Fred and Gail, respectively), a subject title, a date received, a time received, and a size.

ITEM1 through ITEM5 appear in the information viewer portion 210 and are viewable by the user John because the items have a security setting indicating that John is permitted to view ITEM1 through ITEM5. For clarity in describing the invention, an unviewable portion 212 that is unviewable to John is also shown in image 200. The unviewable portion 212 includes ITEM6 and ITEM7 having security settings indicating the items are not to be viewed by the user John.

The image 200 also includes a status bar 214 along its bottom. The status bar includes "count of" summary data 216 indicating the total count of items in the selected folder "Upcoming Events" 204cc that are viewable by John. The status bar 214 includes "size of" summary data 218 indicating the total size of all the items in the selected folder "Upcoming Events" 204cc that are viewable by John.

Note that the "count of" summary data 216 indicates that there are only five items corresponding to ITEM1 through ITEM5 which are viewable to John. The "count of" summary data 216 gives no hint as to the existence of ITEM6 and ITEM7 which are not viewable by John. Furthermore, the "size of" summary data 218 indicates that the total size of the items is 25 kilobytes which represents the total size of only ITEM1 through ITEM5. Thus, there is no indication of the size of the unviewable ITEM6 and ITEM7. Therefore, John can infer nothing about unviewable files within the selected folder "Upcoming Events" 204cc.

A system and method for displaying summary data 216, 218 corresponding only to items for which the user has security access is now described after describing security settings generally. Security settings are often represented in the form of access control lists (ACLs). These security settings are associated with each item ITEM1 through ITEM7. When a user requests to open an item, the computer 20 (FIG. 1) first checks the security setting to see if the user has access to that item. If the user does not have access, the computer 20 might typically display an "access denied" or similar message on the monitor 47. Otherwise, the computer 20 will display the item on the monitor 47.

FIGS. 3A, 3B, 3C and 3D show four examples of ACLs, identified by identification symbols ACL1, ACL2, ACL3 and ACL4, respectively. While ACLs are presented herein as an exemplary way of establishing and enforcing security settings for items stored in a data container, the invention can also be practice with substantially any other techniques for establishing item level security settings, Each ACL of FIGS. 3A, 3B, 3C and 3D includes one or more rows representing a security instruction. As read from left to right, each security instruction includes a class name (e.g., everyone, Barney, John, Managers), a grant/deny instruction (e.g., grant or deny), and an access type (e.g., read or write).

For example, ACL1 has one security instruction which grants to everyone the right to read the associated item. ACL1 might be associated with ITEM2 through ITEM5 (FIG. 2) for which there is no reasons to deny anyone the right to read.

ACL2 includes two security instructions. The lower security instruction grants to everyone the right to read the associated item. However, the upper security instruction denies Barney the right to read the item. These seemingly contradictory instructions are resolved by giving the deny instruction priority and thus granting everyone except Barney the right to read the item. ACL2 might be appropriate for item ITEM1 (FIG. 2) informing everyone, except Barney of course, of Barney's surprise party.

ACL3 includes two security instructions. The lower security instruction grants to everyone the right to read the associated item. However, the upper security instruction denies John the right to read the item. Thus, ACL3 indicates that everyone except John is permitted to read the item. ACL3 might be appropriate for ITEM6 (FIG. 2) informing everyone except John of John's surprise party. Since John is excluded by ACL3, John cannot view ITEM6 on his screen.

ACL4 includes one security instruction granting to managers the right to read. ACL4 might be appropriate for ITEM7 (FIG. 2) informing the managers about the manager meeting. Since John is not a manager, John cannot view ITEM7 on his screen.

It is important to note that each of ACL1, ACL2, ACL3 and ACL4 only contains reading rights since the reading rights are most relevant in determining what summary data should be displayed. However, ACL1, ACL2, ACL3 and ACL4 may each actually represent more than one access control list when considering other rights such as editing and deleting.

For example, ACL1 represents the set of all access control lists that allow everyone to read an item. For example, one access control list might indicate that everyone can read the item, but that only a specific person may edit or delete the item, another might indicate that everyone can read the item, but only managers can edit or delete the item, another might indicate that everyone can read, edit, or delete the item. These potentially numerous access control lists may all be represented by a single ACL1 that ignores the editing and deleting rights for the item and only represents the reading rights for the item. This simplification reduces the amount of memory needed to be used for storing access control lists and reduces the complexity of using these access control lists.

The selected folder "Upcoming Events" has an associated data structure representing a contents table 400 as shown in FIG. 4. Contents table 400 includes a column 402 representing the item identification, a column 404 representing the corresponding ACL identification symbol, and a column 406 representing the corresponding item data.

The selected folder "Upcoming Events" 204cc also has an associated data structure representing a summary data table 500 as shown in FIG. 5. Summary data table 500 includes a column 502 representing the ACL identification symbol and a column 504 representing the corresponding ACL definition. Thus, the content table 400 need only list the relatively small ACL identification, not the relatively long ACL definition for every item. Thus, the summary data table 500 serves to save memory as each ACL definition need only be stored once. As requests for each item is received, the computer will reference the contents table 400 to determine the ACL identification, and then access the summary data table 500 to reference the corresponding ACL definition to determine if the user who generated the request should have access to the item.

The summary data table 500 also includes one or more columns for summary data. For example, the summary data table 500 includes a column 506 for the "count of" items of that ACL identification, and a column 508 for a total "size of" all the items of that ACL identification.

If the selected folder "Upcoming Events" 204cc is selected, the summary data 216 and 218 of the image 200 can be displayed by adding the corresponding summary data for only those ACLs that give John access. For example, John has access to all items associated with ACL1 or ACL2. Thus, to obtain the "count of" summary data 216 (FIG. 2), the computer 20 adds the 4 items of ACL1 to the 1 item of ACL2, resulting in 5 total items. To obtain the "total size" summary data 218, the computer adds the 18 kilobytes of items of ACL1 to the 7 kilobytes of ACL2, resulting in 25 kilobytes total. Thus, all that is necessary is for the summary data table 500 to be up to date.

A system and method for keeping the summary data table 500 up to date is now described with respect to FIGS. 6, 7, 8, 9, 10, 11, 12, 13 and 14. Additions, deletions, and alterations of items might affect the summary data table 500 as described hereinafter.

Referring to FIG. 6, suppose that an eighth item ITEM8 is added to the selected folder 204cc, that ITEM8 has an ACL identification (e.g., ACL1) that is already listed in the summary data table 500 of FIG. 5, and that ITEM8 has a size of 8 kilobytes. The summary data table 500 will be altered as shown in table 700 of FIG. 7. Note that the "count of" ACL1 items has increased by 1 to 5 items total, and that the "size of" ACL1 items has increased by 8 kilobytes to 26 kilobytes total. Thus, the "count of" summary data 216 of the image 200 is increased by 1, and the "size of" summary data 218 is increased by 8 kilobytes. If ITEM8 had an ACL identification such as ACL3 or ACL4 indicating that John does not have security access, then, the summary data 216 and 218 do not change.

Referring to FIG. 8, suppose that the eighth item ITEM8 has a different ACL identification (e.g., ACL5) than the other ACLs in the summary data table 500. The summary data table 500 will be altered as shown in table 900 of FIG. 9. Note that there is a new row created for an ACL identification of ACL5, that the count of this ACL identification is 1, and that the size is now 8 kilobytes, the size of ITEM8. If John has access to items having ACL5, then the "count of" summary data 216 is increased by 1, and the "size of" summary data 218 is increased by 8 kilobytes.

Referring to FIG. 10, suppose that instead of the above, ITEM2 is deleted. The summary data table 500 will be altered as shown in table 1100 of FIG. 11. The "count of" ACL1 items is reduced by 1 to 3 items total, and the "size of" ACL1 items is reduced by the size of the deleted item (i.e., 6 kilobytes) to 12 kilobytes.

Referring to FIG. 12, suppose that instead of ITEM2, ITEM1 is deleted. Since ITEM1 was the only item of ACL2, a row of summary data table 500 is deleted to create table 1300 of FIG. 13. Suppose that instead of deleting ITEM1, ITEM1 is edited to be 2 kilobytes larger. The summary data table 500 is altered as shown in table 1400 of FIG. 14 with the "size of" ACL2 items increased by 2 kilobytes.

Thus, by changing the summary data table 500 as described above whenever an item as added, deleted, or altered, the summary data table 500 is kept up to date enabling the summary data 216 and 218 to likewise be up to date.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by united states letters patent is:

1. In a computer system that includes data containers in which a plurality of items are stored for access and viewing by a plurality of different users, and wherein the various items stored in a given data container are restricted in terms of access by differing levels of security that may be set for each such item, a method of tracking summary data about the items stored in a container in a manner which permits only that summary data to be displayed to a given user that corresponds to the given user's security level, the method comprising steps for:

storing a plurality of data items having item level security settings in a data container of the computer system, at least some of the data items having differing levels of security settings;

for each data container, keeping a running total of an aggregate property of all the data items that correspond to the same security setting; and when a particular user accesses the data container, displaying only the aggregate property for those data items that have the same security setting for which the particular user has viewing rights.

2. The method of claim 1, wherein storing data items having item level security settings in a data container comprises the following act:

storing the data items having the item level security settings in a directory.

3. The method of claim 1, wherein storing data items having item level security settings in a data container comprises the following act:

storing the data items having the item level security settings in a folder.

4. The method of claim 3, wherein storing data items having the item level security settings in a folder comprises the following act:

storing the data items having the item level security settings in the folder of a messaging system.

5. The method of claim 1, wherein storing data items having item level security settings in a data container comprises the following act:

including a plurality of security settings for which each user has viewing rights; and wherein displaying only the aggregate property for those data items that have the same security setting for which the particular user has viewing rights comprises the following act:

computing the sum of the running totals of the aggregate property for all of the plurality of security settings for which the particular user who is accessing the data container has viewing rights.

6. The method of claim 5, wherein the act of, for each security setting, keeping a running total of an aggregate property comprises the following acts:

for each security setting, keeping a running total of a count of all the items of that security setting; and computing the sum of the running totals of the count for all of the at least one security setting for which the user has viewing rights.

7. The method of claim 6, wherein the act of, for each security setting, keeping a running total of a count of all the items of that security setting comprises the following act:

incrementing the count for a given security setting when a new item of the given security setting is added to the data container.

8. The method of claim 6, wherein the act of, for each security setting, keeping a running total of a count of all the items of that security setting comprises the following act:

decrementing the count for a given security setting when an item of the given security setting is deleted from the data container.

9. The method of claim 5, wherein the act of, for each security setting, keeping a running total of an aggregate property comprises the following act:

for each security setting, keeping a running total of a total size of all the data items of that security setting; and computing the sum of the total size for all of the at least one security setting for which the user has viewing rights.

10. The method of claim 9, wherein the act of, for each security setting, keeping a running total of a total size of all the data items of that security setting comprises the following act:

increasing the total size for a given security setting by the size of a new data item when the new data item of the given security setting is added to the data container.

11. The method of claim 9, wherein the act of, for each security setting, keeping a running total of a total size of all the data items of that security setting comprises the following act:

decreasing the total size for a given security setting by the size of a deleted data item when the deleted data item of the given security setting is deleted from the data container.

12. The method of claim 9, wherein the act of, for each security setting, keeping a running total of a total size of all the data items of that security setting comprises the following act:

increasing the total size for a given security setting by an amount of size increase of an altered data item when the altered data item of the given security setting is altered within the data container.

13. The method of claim 9, wherein the act of, for each security setting, keeping a running total of a total size of all the data items of that security setting comprises the following act:

decreasing the total size for a given security setting by an amount of size decrease of an altered data item when the altered data item of the given security setting is altered within the data container.

14. The method of claim 5, wherein the act of, for each security setting, keeping a running total of an aggregate property comprises the following acts:

for each security setting, keeping a running total of a number of all the data items of that security setting; for each security setting, keeping a running total of a total size of all the data items of that security setting;

computing the sum of the running totals of a count for all of the at least one security settings for which the user has viewing rights; and computing the sum of the running totals of a total size for all of the at least one security settings for which the user has viewing rights.

15. In a computer system that includes data containers in which a plurality of items are stored for access and viewing by a plurality of different users, and wherein the various items stored in a given data container are restricted in terms of access by differing levels of security that may be set for each such item, a computer program product for implementing a method of tracking summary data about the items stored in a container in a manner which permits only that summary data to be displayed to a given user that corresponds to the given user's security level, the computer program product comprising:

a computer-readable medium for carrying computer-executable instructions for causing the computer system to implement said method, and wherein said method is comprised of steps for:

storing a plurality of data items having item level security settings in a data container of the computer system, at least some of the data items having differing levels of security settings;

for each data container, keeping a running total of an aggregate property of all the data items that correspond to the same security setting; and when a particular user accesses the data container, displaying only the aggregate property for those data items that have the same security setting for which the particular user has viewing rights.

16. The computer-readable medium of claim 15, wherein storing data items having item level security settings in a data container is comprised of the following act:

storing the data items having the item level security settings in a directory.

17. The computer-readable medium of claim 15, wherein storing data items having item level security settings in a data container is comprised of the following act:

storing the data items having the item level security settings in a folder.

18. The computer-readable medium of claim 17, wherein the act of storing data items having the item level security settings in a folder is comprised of the following act:

storing the data items having the item level security settings in the folder of a messaging system.

19. The computer-readable medium of claim 15, wherein storing data items having item level security settings in a data container is comprised of the following act:

including a plurality of security settings for which the user has viewing rights; and wherein the step for keeping a running total of an aggregate property of all the data items that correspond to the same security setting is comprised of the following act:

computing the sum of the running totals of the aggregate property for all of the plurality of security settings for which the user has viewing rights.

20. The computer-readable medium of claim 15, wherein step for keeping a running total of an aggregate property is comprised of the following act:

for each security setting, keeping a running total of a count of all the items of that security setting; and computing the sum of the running totals of the count for all of the at least one security settings for which the user has viewing rights.

21. The computer-readable medium of claim 20, wherein the step for keeping a running total of a count of all the items of that security setting is comprised of the following act:

incrementing the count for a given security setting when a new item of the given security setting is added to the data container.

22. The computer-readable medium of claim 20, wherein the step for keeping a running total of a count of all the items of that security setting is comprised of the following act:

decrementing the count for a given security setting when an item of the given security setting is deleted from the data container.

23. A computer-readable medium of claim 15, wherein the step for keeping a running total of an aggregate property is comprised of the following acts:

for each security setting, keeping a running total of a total size of all the data items of that security setting; and computing the sum of the total size for all of the at least one security settings for which the user has viewing rights.

24. The computer-readable medium of claim 23, wherein the step for keeping a running total of a total size of all the data items of that security setting is comprised of the following act:

increasing the total size for a given security setting by the size of a new data item when the new data item of the given security setting is added to the data container.

25. The computer-readable medium of claim 23, wherein the step for keeping a running total of a total size of all the data items of that security setting is comprised of the following act:

decreasing the total size for a given security setting by the size of a deleted data item when the deleted data item of the given security setting is deleted from the data container.

26. The computer-readable medium of claim 23, wherein the step for keeping a running total of a total size of all the data items of that security setting is comprised of the following act:

increasing the total size for a given security setting by an amount of size increase of an altered data item when the altered data item of the given security setting is altered within the data container.

27. The computer-readable medium of claim 23, wherein the step for keeping a running total of a total size of all the data items of that security setting is comprised of the following act:

decreasing the total size for a given security setting by an amount of size decrease of an altered data item when the altered data item of the given security setting is altered within the data container.

28. The computer-readable medium of claim 15, wherein the step for keeping a running total of an aggregate property is comprised of the following acts.

for each security setting, keeping a running total of a number of all the data items of that security setting; for each security setting, keeping a running total of a total size of all the data items of that security setting;

computing the sum of the running totals of a count for all of the at least one security settings for which the user has viewing rights; and computing the sum of the running totals of a total size for all of the at least one security settings for which the user has viewing rights.

\* \* \* \* \*

UNITED STATES PATENT AND TRADEMARK OFFICE
CERTIFICATE OF CORRECTION

PATENT NO.     : 6,480,851 B1
DATED          : November 12, 2002
INVENTOR(S)    : F. Soner Terek It is certified that error appears in the above-identified patent and that said Letters Patent is hereby corrected as shown below:

Column 1,
Line 16, after "containers" change "," to -- . --

Column 3,
Line 3, change "containers" to -- contains --

Column 6,
Line 24, start a new paragraph with "FIG. 2"
Line 29, delete "18"

Column 7,
Line 20, change "practice" to -- practiced --
Line 21, after "settings" change "," to -- . --

Column 13,
Line 7, change "w herein" to -- wherein --

Signed and Sealed this

Second Day of September, 2003

JAMES E. ROGAN
*Director of the United States Patent and Trademark Office*